J. McCaffery.
Grain Binder.

No. 100,051. Patented Feb. 22. 1870.

Witnesses:
Chas. Nida
Alex F. Roberts

Inventor:
Jas. McCaffery
per Mumm & Co
Attorneys.

UNITED STATES PATENT OFFICE.

JAMES McCAFFERY, OF WATERLOO, IOWA.

IMPROVEMENT IN HARVESTERS.

Specification forming part of Letters Patent No. 100,051, dated February, 22, 1870.

*To all whom it may concern:*

Be it known that I, JAMES MCCAFFERY, of Waterloo, in the county of Black Hawk and State of Iowa, have invented a new and useful Improvement in Harvesters; and I do hereby declare that the following is a full, clear, and exact description thereof, which will enable others skilled in the art to make and use the same, reference being had to the accompanying drawings, forming part of this specification.

This invention relates to new and useful improvements in machines for harvesting grain, whereby much time and labor are saved; and consists in the construction and arrangement of parts, as hereinafter described.

Figure 1:
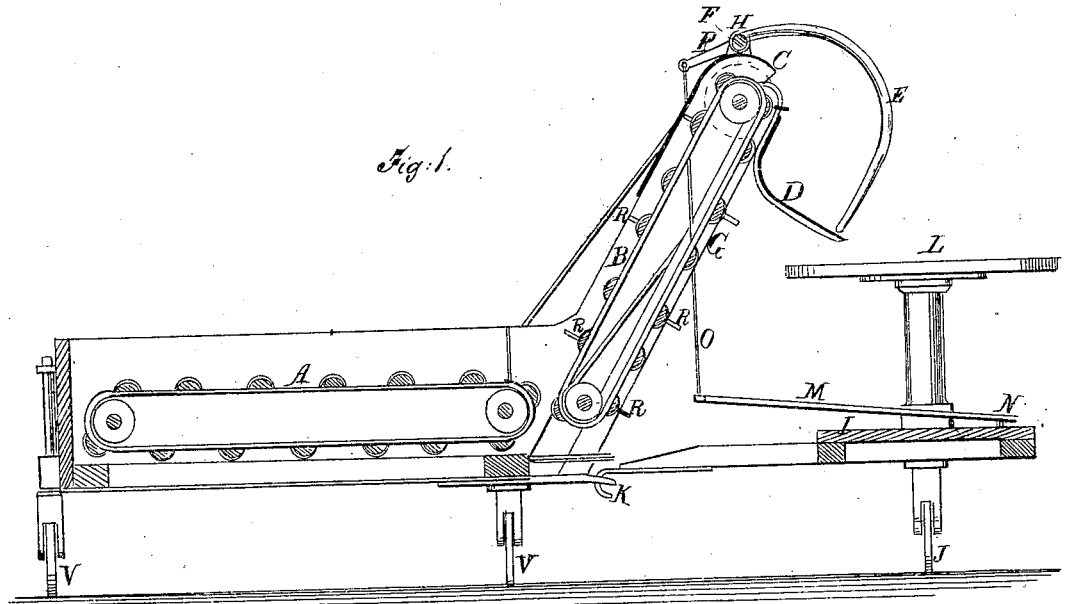
Figure 2:
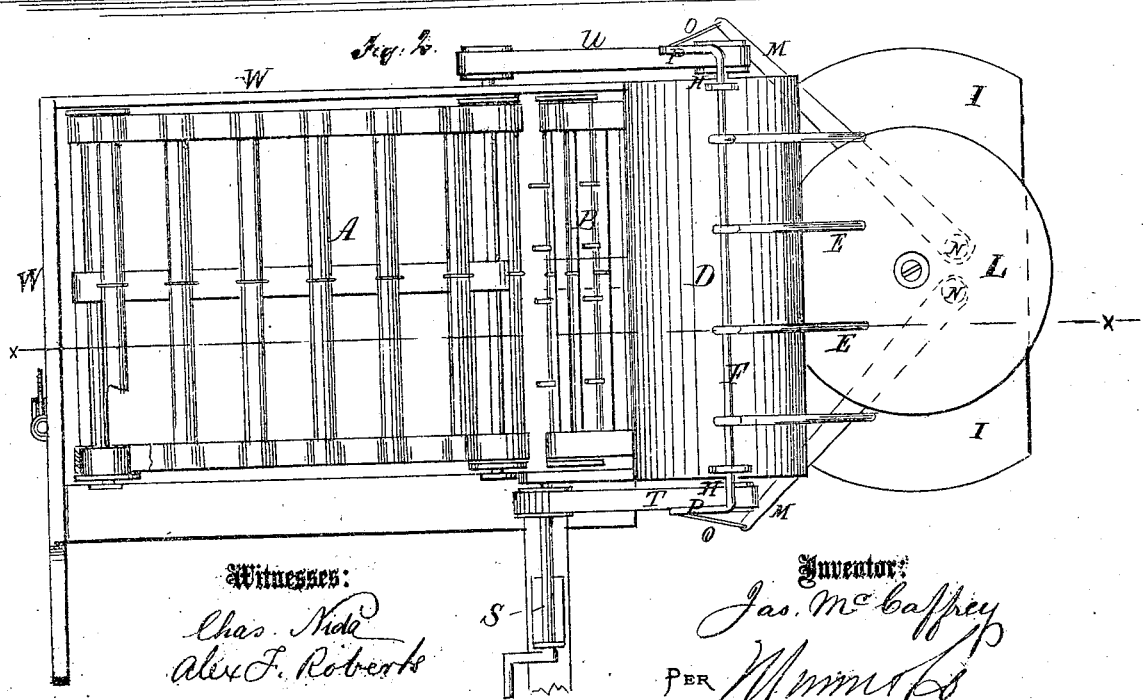

In the accompanying drawing, Figure 1 represents a vertical longitudinal section of machine through the line $x\,x$ of Fig. 2. Fig. 2 is a top or plan view.

Similar letters of reference indicate corresponding parts.

A is a horizontal revolving slat-carrier, which receives the grain from the reaper, the sickle-bar and reel being connected therewith, and the whole operated by the power ordinarily applied for such purposes. B is another carrier, which stands in an inclined position and receives the grain from the apron A and conveys it upward and over the point C, so that it falls into the chute D. The grain is held upon this chute by means of the rack E, the head F of which is confined to the frame G by the short stands H H, in which stands the rake is given an oscillating motion, or is allowed to rise and fall freely, so as to confine the grain on, or release it from, the chute D. I is a platform, upon which one or more operators stand for binding the grain. This platform is supported on wheels J, and is hinged to the machine, as seen at K, so that it will readily accommodate itself to the inequalities of the ground. L is a binding-table, which stands on the platform upon which the grain falls from the chute when the rake is raised.

The rake is operated by means of the treadles M M, one end of which are confined to the platform, as seen at N N. Their other ends are connected with cranks P on the ends of the rake-head by the rods O O.

The operators—one or two—stand on the platform with one foot on the treadle, and by pressing thereon raise the rack and allow the grain to slide from the chute onto the table, where it is bound into bundles by those standing on the platform. By this arrangement the grain is properly divided, and the bundles made of uniform size.

In the slats of the carrier-apron B are projecting pins R for lifting the grain from the horizontal carrier A and elevating it to the point C.

The power for revolving the carriers A and B is applied by means of the projecting shaft S by crank or gearing, as may be deemed best.

T is a belt, by which motion is imparted to the inclined carrier B; and U is a belt from the shaft of the carrier B to a pulley on the shaft of the carrier A. V V are caster-wheels, upon which the machine is supported. W is a casing around two sides of the machine for keeping the grain in place.

The advantages of this apparatus for securing and binding grain are many, and must be obvious to all who are acquainted with the subject.

Having thus described my invention, I claim as new and desire to secure by Letters Patent—

The combination and arrangement of rack E, chute D, platform I, treadle M, and table L in a harvesting-machine, substantially as and for the purposes herein shown and described.

The above specification of the invention signed by me this 24th day of September, 1869.

JAMES McCAFFERY.

Witnesses:
A. S. BLAIR,
C. E. BRONSON.